(12) United States Patent
Leskovec et al.

(10) Patent No.: US 11,797,838 B2
(45) Date of Patent: Oct. 24, 2023

(54) EFFICIENT CONVOLUTIONAL NETWORK FOR RECOMMENDER SYSTEMS

(71) Applicant: Pinterest, Inc., San Francisco, CA (US)

(72) Inventors: Jurij Leskovec, Stanford, CA (US); Chantat Eksombatchai, Redwood City, CA (US); Ruining He, Davis, CA (US); Kaifeng Chen, San Mateo, CA (US); Rex Ying, Stanford, CA (US)

(73) Assignee: Pinterest, Inc., San Francisco, CA (US)

( * ) Notice: Subject to any disclaimer, the term of this patent is extended or adjusted under 35 U.S.C. 154(b) by 1197 days.

(21) Appl. No.: 16/101,184

(22) Filed: Aug. 10, 2018

(65) Prior Publication Data
US 2019/0286752 A1    Sep. 19, 2019

Related U.S. Application Data

(60) Provisional application No. 62/642,527, filed on Mar. 13, 2018.

(51) Int. Cl.
*G06N 3/08* (2023.01)
*G06F 16/901* (2019.01)
(Continued)

(52) U.S. Cl.
CPC ............. *G06N 3/08* (2013.01); *G06F 16/182* (2019.01); *G06F 16/2272* (2019.01);
(Continued)

(58) Field of Classification Search
CPC ............ G06N 3/04; G06N 3/08; G06N 20/00; G06F 16/9035; G06F 16/9535; G06F 16/24578
See application file for complete search history.

(56) References Cited

U.S. PATENT DOCUMENTS 9,177,225 B1   11/2015   Cordova-Diba et al.
9,419,854 B1   8/2016    Wang et al.
(Continued)

FOREIGN PATENT DOCUMENTS

JP   2013519138 A   5/2013
WO   2017168125 A1  10/2017

OTHER PUBLICATIONS

Bagci et al., "Context-Aware Friend Recommendation for Location Based Social Networks using Random Walk", 2016, WWW'16 Companion, pp. 531-536. (Year: 2016).*
(Continued)

*Primary Examiner* — Ying Yu Chen
(74) *Attorney, Agent, or Firm* — Athorus, PLLC

(57) ABSTRACT

Systems and methods for generating embeddings for nodes of a corpus graph are presented. The embeddings correspond to aggregated embedding vectors for nodes of the corpus graph. Without processing the entire corpus graph to generate all aggregated embedding vectors, a relevant neighborhood of nodes within the corpus graph are identified for a target node of the corpus graph. Based on embedding information of the target node's immediate neighbors, and also upon neighborhood embedding information from the target node's relevant neighborhood, an aggregated embedding vector can be generated for the target node that comprises both an embedding vector portion corresponding to the target node, as well as a neighborhood embedding vector portion, corresponding to embedding information of the relevant neighborhood of the target node. Utilizing both portions of the aggregated embedding vector leads to improved content recommendation to a user in response to a query.

17 Claims, 12 Drawing Sheets

(51) Int. Cl.

| | | |
|---|---|---|
| *G06F 16/906* | (2019.01) | |
| *G06N 20/00* | (2019.01) | |
| *G06F 16/22* | (2019.01) | |
| *G06F 16/9536* | (2019.01) | |
| *G06F 16/9535* | (2019.01) | |
| *G06N 3/04* | (2023.01) | |
| *G06F 16/182* | (2019.01) | |
| *G06F 16/9035* | (2019.01) | |
| *G06F 16/51* | (2019.01) | |
| *G06V 30/196* | (2022.01) | |
| *G06F 18/211* | (2023.01) | |
| *G06F 18/214* | (2023.01) | |
| *G06F 18/2413* | (2023.01) | |
| *G06F 9/38* | (2018.01) | |

(52) U.S. Cl.
CPC ............ *G06F 16/51* (2019.01); *G06F 16/906* (2019.01); *G06F 16/9024* (2019.01); *G06F 16/9035* (2019.01); *G06F 16/9535* (2019.01); *G06F 16/9536* (2019.01); *G06F 18/211* (2023.01); *G06F 18/2148* (2023.01); *G06F 18/24147* (2023.01); *G06N 3/04* (2013.01); *G06N 20/00* (2019.01); *G06V 30/1988* (2022.01); *G06F 9/3877* (2013.01)

(56) References Cited

U.S. PATENT DOCUMENTS

| | | |
|---|---|---|
| 9,558,265 B1 | 1/2017 | Tacchi et al. |
| 9,710,544 B1 | 7/2017 | Smith et al. |
| 10,592,732 B1 | 3/2020 | Sather et al. |
| 10,671,672 B1 | 6/2020 | Eksombatchai et al. |
| 10,860,924 B2 | 12/2020 | Burger |
| 11,232,152 B2* | 1/2022 | Leskovec ............ G06F 16/9536 |
| 2003/0014735 A1 | 1/2003 | Achlioptas et al. |
| 2004/0208562 A1 | 10/2004 | Ufongene |
| 2006/0122998 A1 | 6/2006 | Bar-Yossef et al. |
| 2006/0184464 A1 | 8/2006 | Tseng et al. |
| 2008/0275861 A1 | 11/2008 | Baluja et al. |
| 2010/0228731 A1 | 9/2010 | Gollapudi |
| 2010/0241647 A1 | 9/2010 | Ntoulas et al. |
| 2010/0262576 A1 | 10/2010 | Stockwell et al. |
| 2011/0145261 A1 | 6/2011 | Jamjoom et al. |
| 2011/0191374 A1 | 8/2011 | Bengio et al. |
| 2011/0264649 A1 | 10/2011 | Hsiao et al. |
| 2012/0330864 A1 | 12/2012 | Chakrabarti et al. |
| 2013/0275429 A1 | 10/2013 | York et al. |
| 2014/0324864 A1 | 10/2014 | Choe et al. |
| 2014/0354649 A1 | 12/2014 | Aksu et al. |
| 2015/0146603 A1 | 5/2015 | Wu et al. |
| 2016/0070817 A1 | 3/2016 | Aggarwal |
| 2017/0032580 A1 | 2/2017 | Hemani et al. |
| 2017/0046520 A1 | 2/2017 | Ohrimenko et al. |
| 2017/0278135 A1 | 9/2017 | Majumdar et al. |
| 2017/0357896 A1 | 12/2017 | Tsatsin et al. |
| 2017/0364450 A1 | 12/2017 | Struttmann |
| 2018/0103052 A1 | 4/2018 | Choudhury et al. |
| 2018/0336457 A1 | 11/2018 | Pal et al. |
| 2018/0336472 A1 | 11/2018 | Ravi |
| 2018/0349501 A1* | 12/2018 | Ramanath ......... G06F 16/24578 |
| 2018/0373701 A1 | 12/2018 | McAteer et al. |
| 2019/0005400 A1 | 1/2019 | Liu et al. |
| 2019/0026697 A1 | 1/2019 | Burton et al. |
| 2019/0057303 A1 | 2/2019 | Burger |
| 2019/0080204 A1 | 3/2019 | Schroff et al. |
| 2019/0089720 A1 | 3/2019 | Aditham et al. |
| 2019/0095806 A1 | 3/2019 | Canedo et al. |
| 2019/0114362 A1* | 4/2019 | Subbian ............. G06F 16/9535 |
| 2019/0114373 A1 | 4/2019 | Subbian et al. |
| 2019/0130264 A1* | 5/2019 | Rossi .................... G06N 20/00 |
| 2019/0130305 A1 | 5/2019 | Sivertson |

OTHER PUBLICATIONS

Bojchevski et al., "Deep Gaussian Embedding of Attributed Graphs: Unsupervised Inductive Learning via Ranking", Jul. 12, 2017, arXiv: 1707.03815v1, pp. 1-10. (Year: 2017).*
Hamilton et al., "Inductive Representation Learning on Large Graphs", Jun. 7, 2017, arXiv:1706.02216v1, pp. 1-18. (Year: 2017).*
Kipf et al., "Semi-Supervised Classification With Graph Convolutional Networks", Feb. 22, 2017, arXiv:1609.02907v4, pp. 1-14. (Year: 2017).*
Abadi, M. et al., "Tensorflow: Large-Scale Machine Learning on Heterogeneous Distributed Systems," arXiv preprint arXiv:1603.04467, Mar. 16, 2016, 19 pages.
Andoni, A. and Indyk, P., "Near-Optimal Hashing Algorithms for Approximate Nearest Neighbor in High Dimensions," FOCS, 2006, 6 pages.
Bansal et al., "Ask the GRU: Multi-Task Learning for Deep Text Recommendations," RecSys. ACM, Sep. 9, 2016, 8 pages.
Bengio et al., "Curriculum Learning," ICML, 2009, 8 pages.
Broder et al., "Efficient Query Evaluation Using a Two-Level Retrieval Process," CIKM, 2003, 9 pages.
Bronstein et al., "Geometric Deep Learning: Going Beyond Euclidean Data," IEEE Signal Processing Magazine, vol. 34(4), 2017, 25 pages.
Bruna et al., "Spectral Networks and Deep Locally Connected Networks on Graphs," ICLR, 2014, 14 pages.
Chen et al., "FastGCN: Fast Learning with Graph Convolutional Networks via Importance Sampling," in ICLR, 2018, 15 pages.
Covington et al., "Deep Neural Networks for YouTube Recommendations," RecSys. ACM, 2016, 8 pages.
Dai et al., "Discriminative Embeddings of Latent Variable Models for Structured Data," ICML, 2016, 10 pages.
Defferrard et al., "Convolutional Neural Networks on Graphs with Fast Localized Spectral Filtering," NIPS, 2016, 9 pages.
Duvenaud et al., "Convolutional Networks on Graphs for Learning Molecular Fingerprints," NIPS, 2015, 9 pages.
Eksombatchai et al., "Pixie: a System for Recommending 3+ Billion Items to 200+ Million Users in Real-Time," arXiv preprint arXiv:1711.07601, 2017, 10 pages.
Gori et al., "A New Model for Learning in Graph Domains," IEEE International Joint Conference on Neural Networks, 2005, 6 pages.
Goyal et al, "Accurate, Large Minibatch SGD: Training ImageNet in 1 Hour," arXiv preprint arXiv:1706.02677, 2017, 12 pages.
Grover, A. and Leskovec, J., "node2vec: Scalable Feature Learning for Networks," KDD, 2016, 10 pages.
Hamilton et al., "Inductive Representation Learning on Large Graphs," NIPS, 2017, 19 pages.
Hamilton et al., "Representation Learning on Graphs: Methods and Applications," IEEE Data Engineering Bulletin, 2017, 23 pages.
Kearnes et al., "Molecular Graph Convolutions: Moving Beyond Fingerprints," CAMD, vol. 30, Issue 8, 2016, 25 pages.
Kipf, T.N. and Welling, M., "Semi-Supervised Classification with Graph Convolutional Networks," ICLR, 2017, 14 pages.
Li et al., "Gated Graph Sequence Neural Networks," ICLR, 2015, 19 pages.
Mikolov et al., "Distributed Representations of Words and Phrases and Their Compositionality," NIPS, 2013, 9 pages.
Monti et al., "Geometric Matrix Completion with Recurrent Multi-Graph Neural Networks," NIPS, 2017, 9 pages.
OpenMP Architecture Review Board, OpenMP Application Programming Interface Version 4.5., 2015, 368 pages.
Perozzi et al., "DeepWalk: Online Learning of Social Representations," KDD, 2014, 10 pages.
Scarselli et al., "The Graph Neural Network Model," IEEE Transactions on Neural Networks vol. 20, No. 1, 2009, pp. 61-80.
Simonyan, K. and Zisserman, A., "Very Deep Convolutional Networks for Large-Scale Image Recognition," arXiv preprint arXiv:1409.1556, 2014, 13 pages.
Van den Berg et al., "Graph Convolutional Matrix Completion," arXiv preprint arXiv:1706.02263, 2017, 9 pages.
Van den Cord, A., Dieleman, S., and Schrauwen, B., "Deep Content-Based Music Recommendation," NIPS, 2013, 9 pages.

(56) References Cited

OTHER PUBLICATIONS

Chandra Bhagavatula et al., "Content Based Citation Recommendation", ARXIV.org, Cornell University Library, 201 Olin Library, Cornell University, Ithaca, NY 14853, Feb. 22, 2018.
International Search Report and Written Opinion for International Application No. PCT/US2019/021932, dated Jun. 14, 2019.
Omar M. Parkhi et al., "Deep Face Recognition", Proceedings of the British Machine Vision Conference, Jan. 1, 2015, pp. 41.1-41.12.
Xiaofan Zhang et al., "Embedded Label Structures for Fine-Grained Feature Representation", 2016 IEEE Conference on Computer Vision and Pattern Recognition (CVPR), IEEE, Jun. 27, 2016, pp. 1114-1123, [retrieved Dec. 9, 2016].

* cited by examiner $RN(J) = \{G, H, I, L, P\}$ $RN(G) = \{E, J, Q, S\}$ $RN(H) = \{D, F, I\}$ $RN(I) = \{D, F, H, J, L\}$ $RN(L) = \{H, I, J, N, P, U\}$ $RN(P) = \{A, B, L, U\}$

EFFICIENT CONVOLUTIONAL NETWORK FOR RECOMMENDER SYSTEMS

CROSS-REFERENCE TO RELATED MATTER

This application claims priority to U.S. Provisional Patent Application No. 62/642,527, titled "Graph Convolutional Neutral Networks for Web-Scale Recommender Systems," filed Mar. 13, 2018, which is incorporated by reference.

BACKGROUND

Recommender systems are typically online, network-accessible systems or services that make recommendations of content to a user/person in response to user interactions and queries. Generally speaking, recommended content is viewed as being similar, relevant and/or complimentary to the subject matter of a user query to the online service. For example, the online service Pinterest® allows its users to "pin" content to the user's "pin boards." Pinning the content to a board, typically considered as a user interaction, is viewed as a "query" and, in response, the Pinterest recommender system suggests additional pins/content to the user that are viewed as being similar, relevant and/or complimentary, and presumably desirable to the user's pin or contents of the target pin board.

In many instances, in order to make recommendation of content, recommender systems perform numerous analyses on a large corpus of items and data to determine what is likely similar, complimentary, relevant and/or desirable to that computer user for that particular item query. More and more, these analyses are conducted and/or implemented through deep neural networks. Often, these analyses are based on embedding vectors (also referred to as feature vectors) or other items of content that are known to the service. Each embedding vector represents various aspects of the corresponding item of content. By comparing an embedding vector of a "query" to the embedding vectors of other items of known content, the recommender service is able to provide similar and/or complimentary content.

When the body of known content becomes large, simply comparing elements of embedding vectors against the embedding vector of the query is impractical. For example, Pinterest's corpus of content includes billions of pins with 10's of billions of connections among the pins. Comparing an embedding vector of a query against embedding vectors of billions of other items of content is simply infeasible. Moreover, the problem of scale (how to recommend highly relevant content from billions of items) is further exacerbated as the corpus of data is constantly evolving and growing, as is the case when hundreds of millions of users are posting or pinning data on a daily, even hourly, basis.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
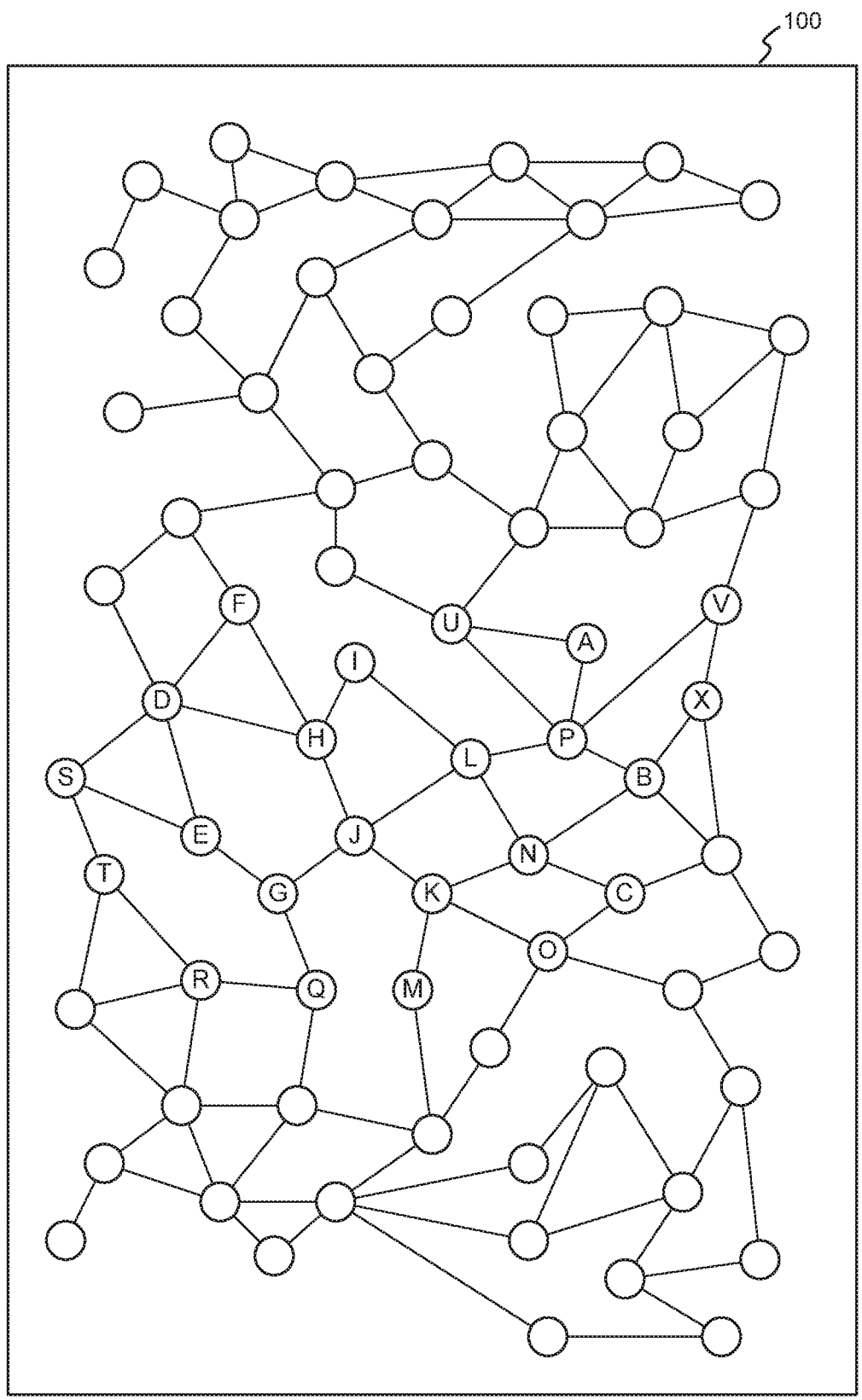
FIG. 1 is a pictorial diagram illustrating an exemplary corpus graph of data for use in description with regard to the disclosed subject matter.

According to aspects of the disclosed subject matter, disclosed is a data-efficient, graph-based convolutional network (GCN) system that combines elements of a relevant neighborhood and node convolutions to generate enhanced embedding vectors for nodes of the graph. More particularly, these enhanced embedding vectors, referred to as aggregated embedding vectors, combine embedding information of a target node (in the form of an embedding vector) with sub-graph/relevant neighborhood embedding information to form an aggregated embedding vector for the nodes of a corpus graph. These aggregated embedding vectors provide greater insight into relevant features of a given node in a corpus graph, which leads to improved identification of relevant nodes in the graph for recommendation to a user in response to a query.

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" with regard to multiple items should be viewed as meaning either or both items.

Reference is made to the terms embedding (or embedding information), embedding vector, neighborhood embedding vector, and aggregated embedding vector. For purposes of clarity and definition, an "embedding" or embedding value corresponds to, as is descriptive of, some particular aspect of an item of content. Typically, though not exclusively, embedding information (a set of embedding values of an item of content) is determined as a result of convolutions of a deep neural network. Typically, embedding information for an item of content is output by a deep neural network in the form of an embedding vector.

With regard to generating embedding information of item of content, an embedding vector corresponding to an item of content is generated from both the item of content and metadata that may be associated with that item of content. The metadata may comprise, by way of illustration and not limitation, information regarding a content type (e.g., image, audio, video, data type, etc.) and textual content (e.g., descriptions of the item, titles, uniform resource identification data, etc.)

An embedding vector is a collection of embedding data, sometimes also called a feature vector. An embedding vector is an n-dimensional vector of embeddings (each embedding typically represented as a numerical value to facilitate processing and analysis) that represents multiple aspects of the corresponding item of content. As indicated above, typically though not exclusively, an embedding vector of an item of content is determined through convolution by a deep neural network, which is a machine learning model. As suggested, embedding vectors (both of a query item and other items of content in a corpus graph) are used to identify relevant/related content. As those skilled in the art will appreciate, the embedding vector space associated with these embedding vectors is often called a feature space. Additionally, and in accordance with aspects of the disclosed subject matter, in order to reduce the dimensionality of the embedding space, a number of dimensionality reduction techniques may be employed in generating an embedding vector for an item of content.

In contrast to the embedding vector, a neighborhood embedding vector refers to the combination or pooling of embedding vector features derived from the embedding vectors of a target item's relevant neighborhood. The combination of an item's own embedding vector and neighborhood embedding vector is referred to as the content item's aggregated embedding vector. According to embodiments of the disclosed subject matter and for illustration and not limitation, an aggregated embedding vector may comprise 2048 floating point values, with 1024 of these "floats" reserved for the target node's embedding vector, and 1024 floats reserved for the target node's neighborhood embedding vector.

For purposes of clarity and definition, the term "query" refers to an item of content for which one or more recommendations may be made. In this context, the user may or may not be actively seeking additional information with regard to the submission of the item of content to the online system. For example, a user's query may be initiated in response to the computer user interacting with an item of content without directly initiating the request.

As will be readily appreciated, many online systems maintain large bodies of user-supplied and/or user-generated content, and this body of content is often organized as a graph of content, with the graph nodes corresponding to an item of content, and edges between graph nodes representing relationships between items of content. These graphs of content can represent user/people relationships (as may be maintained by social networking services), interest graphs between people and topics, collections of data, and the like. In popular online services, these bodies of graph data often become extremely large and complex. As indicated above, Pinterest® maintains a graph of content/data that includes billions of pins organized on billions of boards, generated by millions of users. As will be readily appreciated, this corpus of content/data, referred to as a corpus graph, becomes extraordinarily complex and inter-related.

With regard to Pinterest®, and generally applicable to many social networking services that maintain content from users, users often organize related content, and the relationship connections in the corpus graph reflect these close relationships. As such, there are many areas within a corpus graph that have a high level of internal cohesion. For purposes of the disclosed subject matter, these areas are referred to as neighborhoods within the corpus graph.

As indicated above, deep learning neural networks (i.e., GCNs) have relied upon the entire corpus graph in order to generate embedding vectors for the various items of the corpus graph. These embedding vectors are used to identify similar and/or related content in regard to a "request." However, as the number of data points and relationships increase, processing the embedding vectors of an entire corpus graph requires more and more time, using immense processing bandwidth. Keeping the embedding vectors of a corpus graph up-to-date, and searching for related content among billions of embedding vectors is viewed as being impractical if not impossible.

According to aspects of the disclosed subject matter, by selecting a relevant neighborhood for a target node within a corpus graph, an embedding vector that reflects embeddings of the target node as well as embeddings of a relevant neighborhood, i.e., an aggregated embedding vector, can be determined without the processing/convolution of the entire corpus graph. Of course, in a recommender system, leveraging both the embeddings of an item of content as well as the aggregated embeddings of the relevant neighborhood for an item of content leads to enhanced identification of related and/or relevant content that may be used by a recommender system in recommending content to a user.

To illustrate the generation of the aggregated embedding vectors for nodes within a corpus graph, reference is made to the figures. FIG. 1 is a pictorial diagram illustrating an exemplary corpus graph 100 for use in description and illustration with regard to the disclosed subject matter. Corpus graph 100 includes various nodes illustrated as circles in the graph 100 (each node corresponding to an item of content of the corpus graph) and connections or edges between nodes indicating relationships between the nodes. By way of illustration and not limitation, these relationships may correspond to co-occurrence in a collection of content items, references of a first content item to a second content item, and the like. For purposes of description and illustration, various nodes within the corpus graph 100 are labeled, including Nodes A-V.

In contrast to actual corpus graphs that include billions of items of content with tens of billions of inter-connections, corpus graph 100 is quite simple. However, corpus graph 100 is suitable for describing aspects of the disclosed subject matter, including illustrating the selection of relevant neighborhoods for computing an aggregated embedding vector for a given node.

Figure 2:
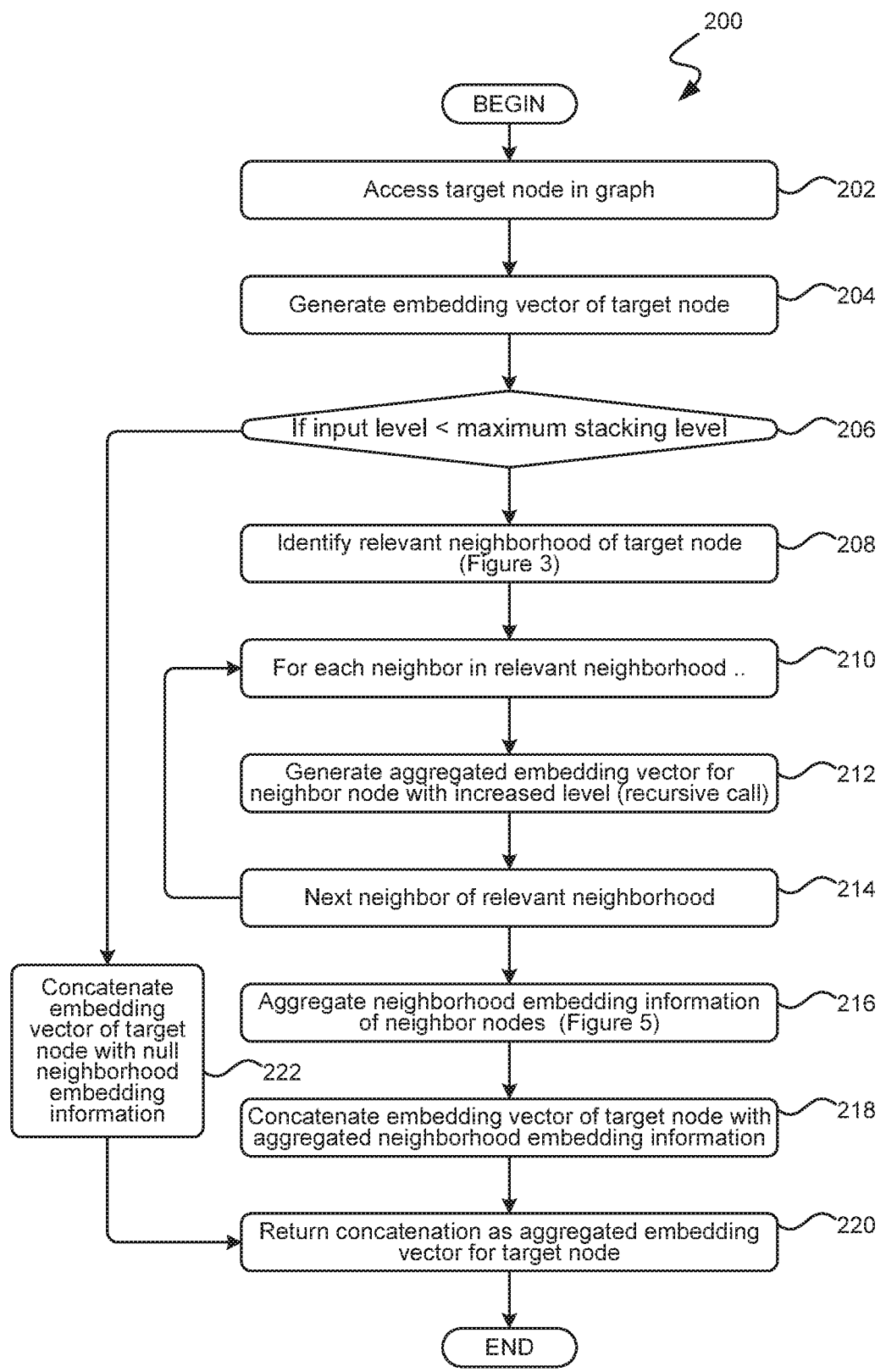
FIG. 2 is a flow diagram illustrating an exemplary routine suitable for generating an aggregated embedding vector for a query node that includes embedding values of the relevant neighborhood of the query node, and in accordance with aspects of the disclosed subject matter.

Reference is further made in regard to FIG. 2. FIG. 2 is a flow diagram illustrating an exemplary routine 200 suitable for generating an aggregated embedding vector for a query node that includes embedding values of the relevant neighborhood of the query node, and in accordance with aspects of the disclosed subject matter. For purposes of illustration, reference will be made in regard to Node J of corpus graph 100 as the target node, particularly in regard to generating an aggregated embedding vector for Node J.

Regarding routine 200, this routine is described as a recursive routine, i.e., a routine that "calls" itself as needed to carry out its complete function. In regard to routine 200 and according to aspects of the disclosed subject matter, routine 200 relies upon an "input level" and a "maximum stacking level" to limit the number of recursive iterations that occur. This maximum stacking level corresponds to the number of neighborhood levels that may be used in generating the neighborhood portion of an aggregated embedding vector for a target node. In various embodiments, the number of neighborhood levels that are used is set to 2. In regard to routine 200, as part of an initial call to the routine 200, an initial input level of 0 is provided. Additionally, the target node is also an input parameter to the recursive routine 200. As those skilled in the art will then appreciate, an initial call to routine 200 identifies both the target node for which an aggregated embedding vector, $AEV_{tn}$, is sought, and 0 (indicating that this is the initial call).

Beginning at block 202, the target node (e.g., Node J) within the corpus graph 100 is accessed. At block 204, an embedding vector, $EV_{tn}$, for the target node is generated. This embedding vector is generated from the target node itself and any metadata that may be associated with the target node. For example, assuming that Node J (the target node) is an image, an embedding vector, $EV_J$, is generated based on convolutions of a deep neural network of the image and further based on any metadata that may be associated with Node J. Convolving an item of content via a deep neural network is described in greater detail below in regard to FIG. 8.

At decision block 206, a determination is made as to whether the input level has reached the maximum stacking level, which check serves to limit the amount of neighborhood information that is gathered and included in an aggregated embedding vector for the target node. Indeed, each recursive call increased the input level by one, up to the maximum stacking level. If, at decision block 206, the input level is not less than the maximum stacking level (indicating that the number of stacking levels of neighborhood embedding information has been reached), the routine 200 proceeds to block 222. Because this block is reached indicating that the limit of stacking of neighborhood embedding information has been reached, at block 222, no additional neighborhood embedding information is generated for this target node. Accordingly, at block 222, the embedding vector, $EV_{tn}$, for the current target node is concatenated with a null representation of neighborhood embedding information, and at block 220 the resulting concatenation is returned as an aggregated embedding vector, $AEV_{tn}$, for this current target node at the current input level. Thereafter, the routine 200 terminates.

In regard to decision block 206, if the input level is less than the maximum stacking level (indicating that the number of stacking levels of neighborhood embedding information has not yet been reached), the routine 200 proceeds to block 208. At block 208, the relevant neighborhood of the inputted target node is identified. In a corpus graph such as corpus graph 100, the relevant neighborhood comprises those nodes in the corpus graph, that are directly or indirectly connected to the target node via at least one relationship/edge, that have the greatest relationship and/or impact to the target node. Neighboring nodes that frequently co-occur in collections with the target node are viewed as being more relevant and related to the target node than nodes that co-occur in collections less frequently. Generally speaking, those neighboring nodes having stronger relationships with the target node (e.g., frequency of co-occurrence, frequency of reference, similarity in features, and the like) are viewed as the relevant neighborhood of the target node. Determining the relevant neighborhood of the current target node is described in regard to routine 300 of FIG. 3 and relies upon a novel random walk selection to identify a relevant neighborhood of a target node.

According to aspects of the disclosed subject matter, a random walk relies upon the frequency of references from one node to another. This random walk utilizes random selection of edge/relationship traversal in a manner that limits to the distance/extent of a relevant neighborhood and relies upon frequency/strength of the various edges to identify a sub-graph of the corpus graph, where the sub-graph corresponds to the relevant neighborhood of the target node. In this manner, nodes that have stronger relationships in a given sub-graph of the corpus graph are identified as the relevant neighborhood of a given node.

Figure 3:
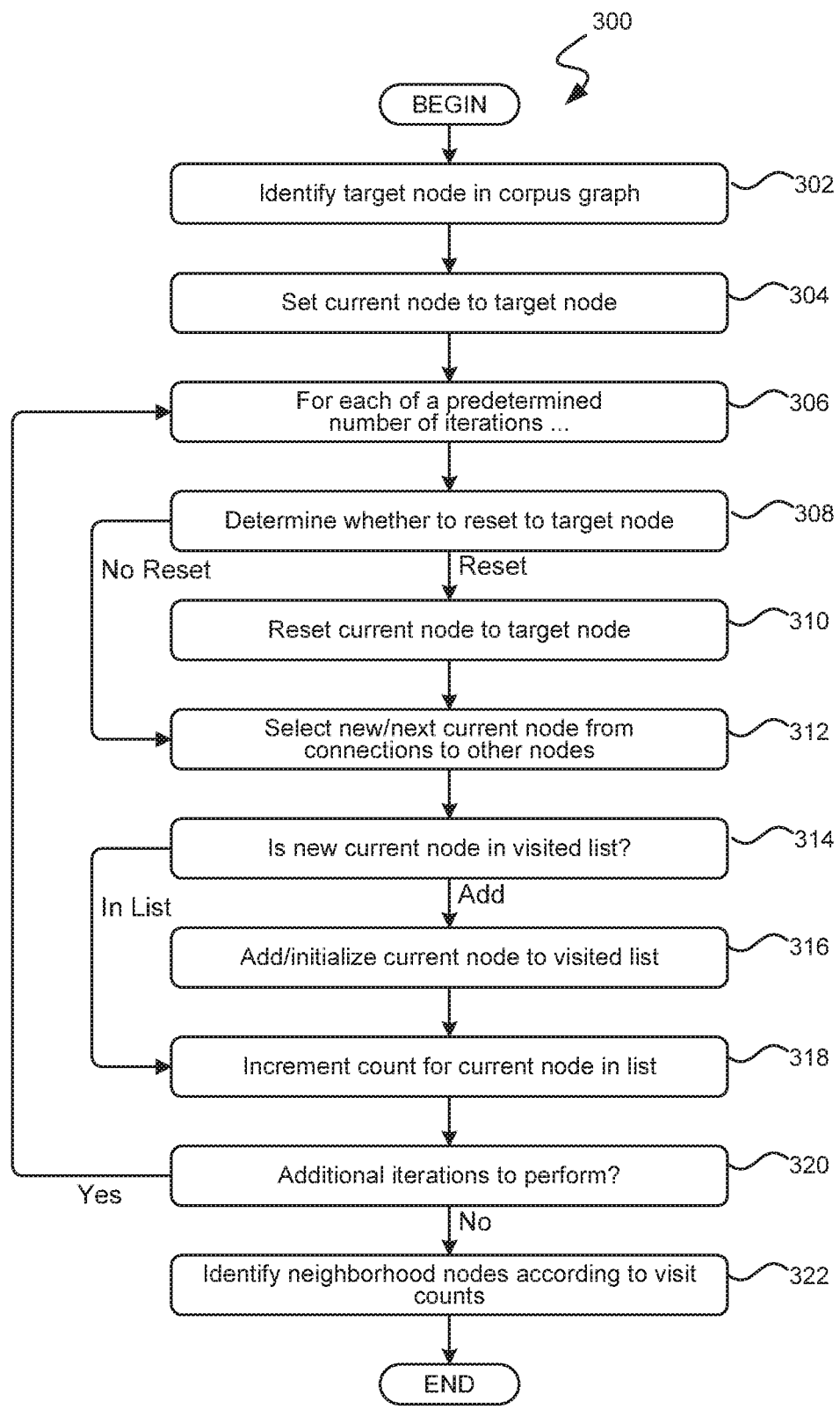
FIG. 3 is a flow diagram illustrating an exemplary routine suitable for identifying the relevant neighborhood of a target node in accordance with aspects of the disclosed subject matter.
Figure 4A:
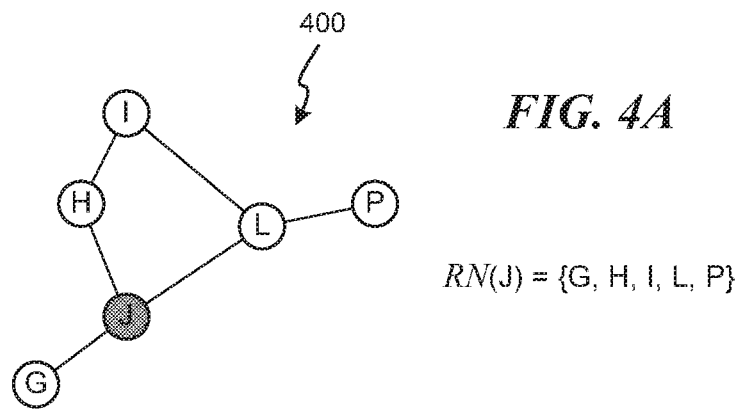
FIGS. 4A-4F are a pictorial diagram illustrating exemplary sub-graphs of the corpus graph of FIG. 1, where each sub-graph corresponds to a relevant neighborhood of a node of the corpus graph, in accordance with aspects of the disclosed subject matter.
Figure 4B:
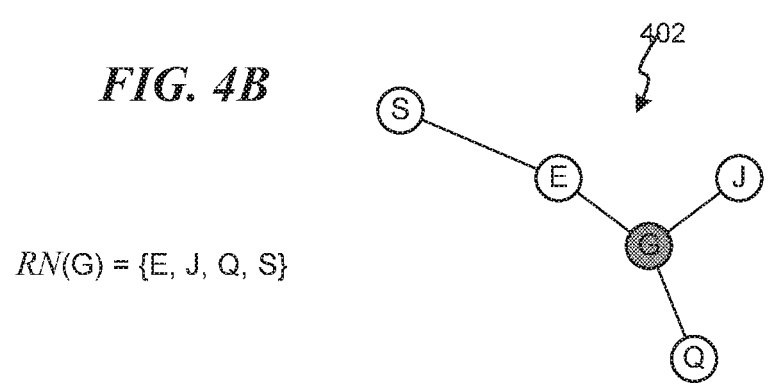
Figure 4C:
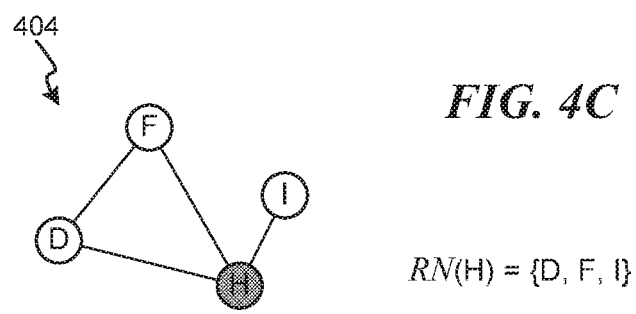
Figure 4D:
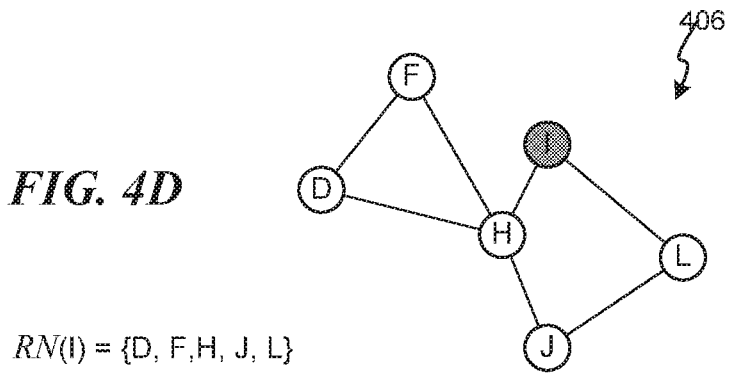
Figure 4E:
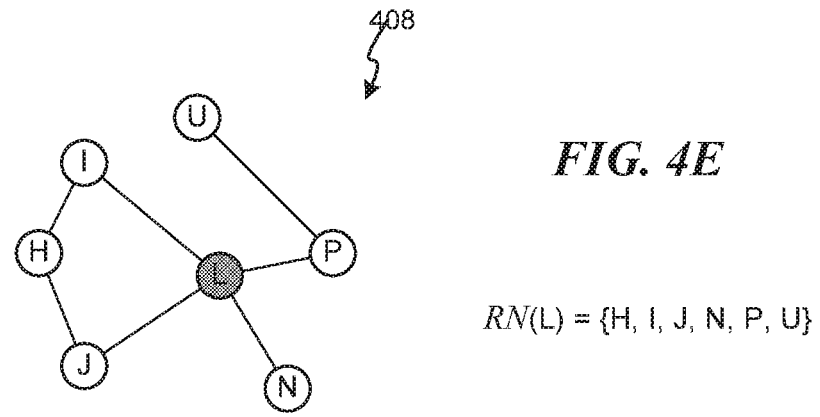
Figure 4F:
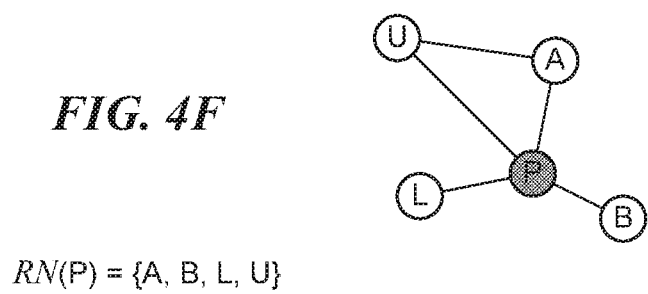

Turning to FIG. 3, FIG. 3 is a flow diagram illustrating an exemplary routine 300 suitable for identifying the relevant neighborhood of a target node in a corpus graph, in accordance with aspects of the disclosed subject matter. As with routine 200, the target node is an input parameter to routine 300.

At block 302, the target node in the corpus graph 100 is identified. At block 304, a temporary variable for use in routine 300, referred to as the "current node", is initialized with the inputted target node. For illustration purposes, assume that the target node is Node J of corpus graph 100.

At block 306, an iteration loop is begun, beginning with the current node. The various steps within this iteration are carried out to identify the important, relevant nodes to the target node. To ensure that the important neighborhood nodes to the target node are identified, a sufficient number of iterations should be selected in order to generate an accurate representation of the important, relevant nodes. While there are many possible number of iterations, in one embodiment, 10000 iterations may be carried out.

At block 308 and as a first operation in the random walk, a determination is made as to whether to reset the current node back to the target node. Resetting the current node back to the target node keeps the selections of "next" current nodes from branching too far away from the target node. According to aspects of the disclosed subject matter, the determination to reset back to the target node is a random determination. For example, in one embodiment a random selection of one of three choices is made, where one of the three choices causes a reset of the current node back to the target node, while the other two choices do not cause a reset. Of course, numerous other ratios for resetting (e.g., 1 out of 4, 2 out of 5, 2 out of 7, etc.) may be used according to the desired breadth and depth of the identified neighborhood of the target node. Regarding this random selection at block 308, if the random determination is to reset the current node back to the target node, at block 310 the current node is reset to point back to the target node. Alternatively (not to reset), the routine 300 proceeds from block 308 directly to block 312.

At block 312 and with reference to the current node, a selection from among the various connections between the current node and other, connected nodes is made. This selection is made as a random selection from among the connections between the current node and those other nodes in consideration of the frequency of connections between the current node and another node. For example and with reference to corpus graph 100 of FIG. 1, Node F is connected to both Nodes D and H. Without considering the frequency between any nodes, a random selection of a next current node from Node F would result in a 50% likelihood of selecting either Node D or Node H. However, if the frequency of relationships between Nodes F and D were three times more frequent than between Nodes F and H, then the likelihood of selection of Node D from Node F would be 75%. As part of the random selection of a next/new current node of block 312, the selected node becomes the new current node.

At block 314, a determination is made as to whether the new current node is already in a "visited list." This visited list tracks those nodes that have been visited as part of the random walk, and further tracks and/or indicates how many times each node in the list has been visited during this random walk. Accordingly, at block 314, if it is determined that the new current node is not already identified in the visited list, at block 316, the current node (e.g., Node I) is added to the visited list and initialized to zero (no previous visits).

At block 318, the visit count in the visited list for this new current node is incremented, indicating a new visit as part of the random walk. At block 320, after having completed the steps of an iteration described above, if there are more iterations to perform, the routine 300 returns to block 306 for the next iteration. If there are no additional iterations to perform, the routine 300 proceeds to block 322.

At block 322, the visit list is examined to determine which nodes are most relevant to the target node according to the various visit counts. This selection of the relevant neighborhood for the target node may be made according to any number of criteria based on the number of visits at the various nodes, such as (by way of illustration and not limitation): the top n-most nodes that have the highest visit count (e.g., the top 200 most-frequently visited nodes); the top n-most percentage of nodes that have the highest visit count (e.g., the top ten percent of the nodes that were visited); the top n-most nodes that have a threshold number of visits (e.g., those nodes that have been visited at least 20 times); the top n-most nodes that collectively represent at least a threshold percentage of all visits (e.g., the top-most visited nodes that collectively comprise at least 15% of the visits), and the like. In many instances, the total number of nodes that were visited may be a factor in determining threshold numbers and/or percentages.

FIGS. 4A-4F are a pictorial diagram illustrating exemplary sub-graphs of the corpus graph of FIG. 1, where each sub-graph represents a relevant neighborhood of a target node of the corpus graph, in accordance with aspects of the disclosed subject matter. In each of these sub-graphs (including sub-graphs 400-410), the shaded node of the respective sub-graph represents the target node and the unshaded nodes represent the neighbor nodes as determined by the random walk process. With reference to FIGS. 4A-4F, sub-graph 400 illustrates the relevant neighborhood of target Node J as comprising the set of Nodes G, H, I, L, and P, denoted as RN(J)={G, H, I, L, P}. The following list illustrates exemplary relevant neighborhoods for various nodes within the corpus graph, as may be determined by the random walk process of routine 300:

RN(J)={G, H, I, L, P};

RN(G)={E, J, Q, S};

RN(H)={D, F, I};

RN(I)={D, F, H, J, L};

RN(L)={H, I, J, N, P, U}; and

RN(P)={A, B, L, U}.

According to aspects of the disclosed subject matter and as shown in FIGS. 4A-4F, relevant neighborhood nodes for a target node, such as Node J, do not need to be directly connected to the target node. For example, Nodes D, F, and J of sub-graph 406 are only indirectly connected to target Node I, yet included in the relevant neighborhood of target Node I. In processing the neighborhood nodes for neighborhood embedding information, the link distance between a target node and a neighborhood node does not play a factor.

After identifying the nodes of the relevant neighborhood of the target node, the routine 300 terminates.

Returning again to routine 200, after having identified the relevant neighborhood for the current target node, at block 210 an iteration loop is begun for purposes of generating neighborhood embedding information from the current target node's relevant neighborhood. This iteration process iterates through each of the nodes of the current target node's relevant neighborhood. With referent to the example about, for target Node J, the iteration loop iterates through the set of Nodes G, H, I, L and P.

At block 212 and as part of iterating through the neighborhood nodes, a recursive call to this same routine 200 is made with the target node being the currently iterated neighbor node and an incremented/increased input level. Continuing the example from above, routine 200 may be called for target Node G with an input level of 1.

After determining an aggregated embedding vector for a neighbor node, at block 214 if there are additional neighbor nodes to process, the routine 200 returns to block 210 for the additional processing/iterations. Alternatively, once all neighbor nodes have been processed, meaning that aggregated embedding vectors for each of the neighbor nodes of the current target node have been generated, the routine 200 proceeds to block 216.

Figure 5:
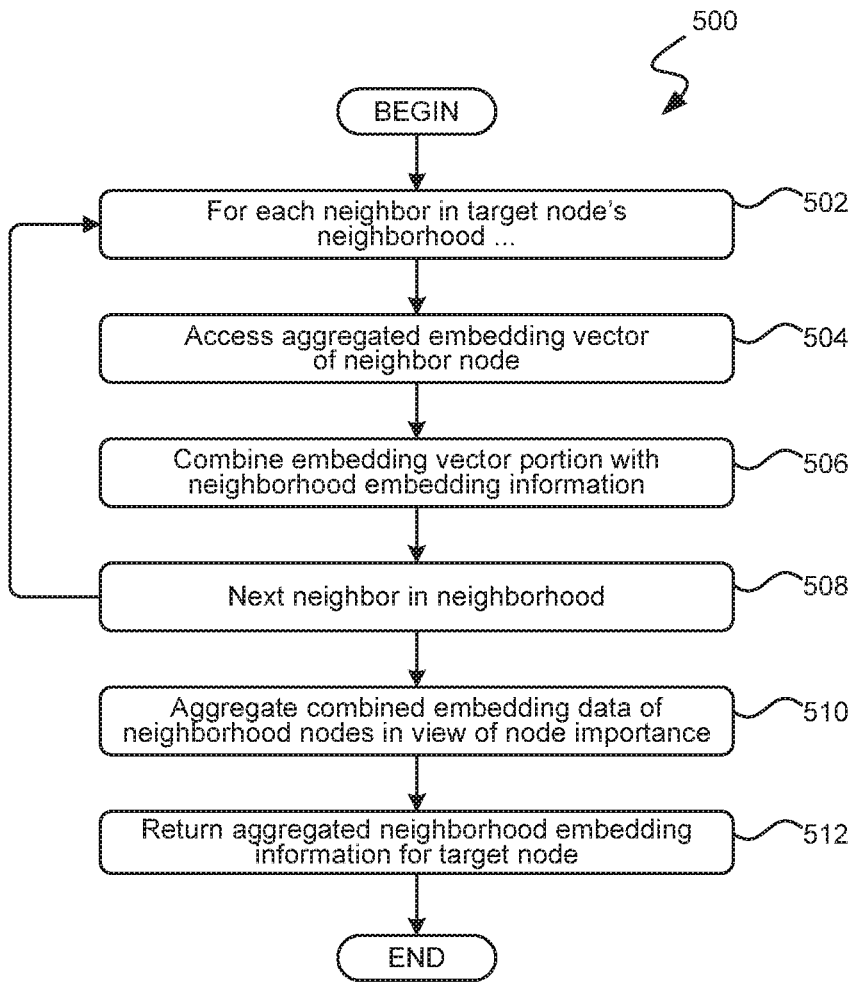
FIG. 5 is a flow diagram illustrating an exemplary routine for aggregating neighborhood embedding vectors into neighborhood embedding information for a target node in accordance with aspects of the disclosed subject matter.

At block 216, the aggregated embedding vectors of the neighbor nodes are aggregated and combined into neighborhood embedding information. With reference to FIG. 5, FIG. 5 is a flow diagram illustrating an exemplary routine 500 for aggregating neighborhood embedding vectors of neighbors of a target node into neighborhood embedding information and in accordance with aspects of the disclosed subject matter.

Beginning at block 502, an iteration loop is begun to iterate through each of the target node's neighbors. With regard to the example discussed above, assuming that the target node is Node J, this means that routine 500 iterates through each of Nodes G, H, I, L and P. At block 504, the aggregated embedding vector of the neighbor node (as determined by routine 200) is accessed. At block 506, the embedding vector portion of the aggregated embedding vector is combined with the neighborhood embedding information portion.

Combining the embedding vector portion of the aggregated embedding vector with the neighborhood embedding information portion includes identifying those embedding values directed to the same aspect/feature and choosing a resulting value for that aspect/feature. In various embodiments, where a conflict arises, the aspect/feature of the embedding vector is selected over network embedding information, assuming that the values of the current neighbor have more influence than the neighbor's neighbors. Where there is no value for an aspect/feature from the embedding vector, the value from the network embedding information may be used.

After combining the embedding vector portion with the neighborhood embedding information portion for a neighbor node, at block 508 the iteration process determines whether there are additional neighbor nodes to process or if all have been processed. If there are additional nodes to process, the routine 500 returns to block 502 where another neighbor node is selected for processing. Alternatively, when all neighbor nodes have been processed, the routine 500 proceeds to block 510.

At block 510, the combined embedding data (from the iteration loop of block 502-508) of each neighbor node is then combined/aggregated into neighborhood embedding information for the target node. According to various aspects of the disclosed subject matter, weights may be applied to the combined embedding data of any of the neighbor nodes as determined by the frequency that the neighbor node was visited during the random walk process, such that when combining similar features/aspects, conflicting elements are weighted and those values that have the greatest, combined weight are selected for the particular feature/aspect. The resulting aggregation is viewed as the neighborhood embedding information for the current target node. At block 512, the aggregated neighborhood embedding information for the current target node is returned and the routine 500 terminates.

Returning to routine 200 of FIG. 2, after generating the neighborhood embedding information for the current target node, at block 218, the embedding vector of the current target node and the neighborhood embedding information for the current target node are concatenated, forming an aggregated embedding vector for the target node. At block 220, the aggregated embedding vector for the target node is returned. Thereafter, the routine 200 terminates.

Figure 6:
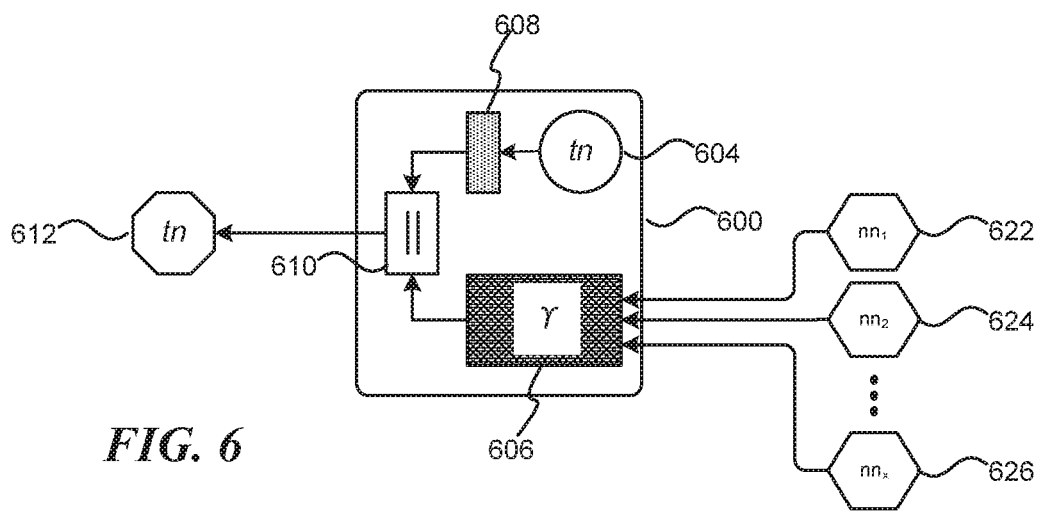
FIG. 6 is a pictorial diagram illustrating the generation process of an aggregated embedding vector for each level of recursion in accordance with aspects of the disclosed subject matter.

Regarding the recursive process described in routine 200, those skilled in the art will appreciate that at each level, a similar process is carried out. This process includes the convolution of a target node to generate an embedding vector, the aggregation of embedding vectors of the target node's neighbors to generate neighborhood embedding information, and the concatenation of the two which forms the aggregated embedding vector of the target node. FIG. 6 is a pictorial diagram illustrating the generation process 600 of an aggregated embedding vector 612, as carried out for each level of recursion and in accordance with aspects of the disclosed subject matter.

This process 600 includes, accessing a target node 604 and convolving 608 the target node. Additionally, aggregated embedding vectors of the target node's neighbors, such as aggregated embedding vectors 622-626, are combined/aggregated 606 into neighborhood embedding information, as described above in regard to routine 500 of FIG. 5. The embedding vector and the neighborhood embedding information are then concatenated 610 into an aggregated embedding vector 612 for the target node.

As indicated above, this process 600 is a recursive process, particularly in regard to generating the aggregated embedding vectors of the target node's neighbors. Moreover, and as mentioned above, the recursive nature is limited to some predetermined fixed level, referred to as the maximum stacking level (i.e., stacking the neighborhood embedding information from multiple levels). This allows for the identification of localized neighborhoods and the influence that these neighborhoods have on a target node.

Figure 7:
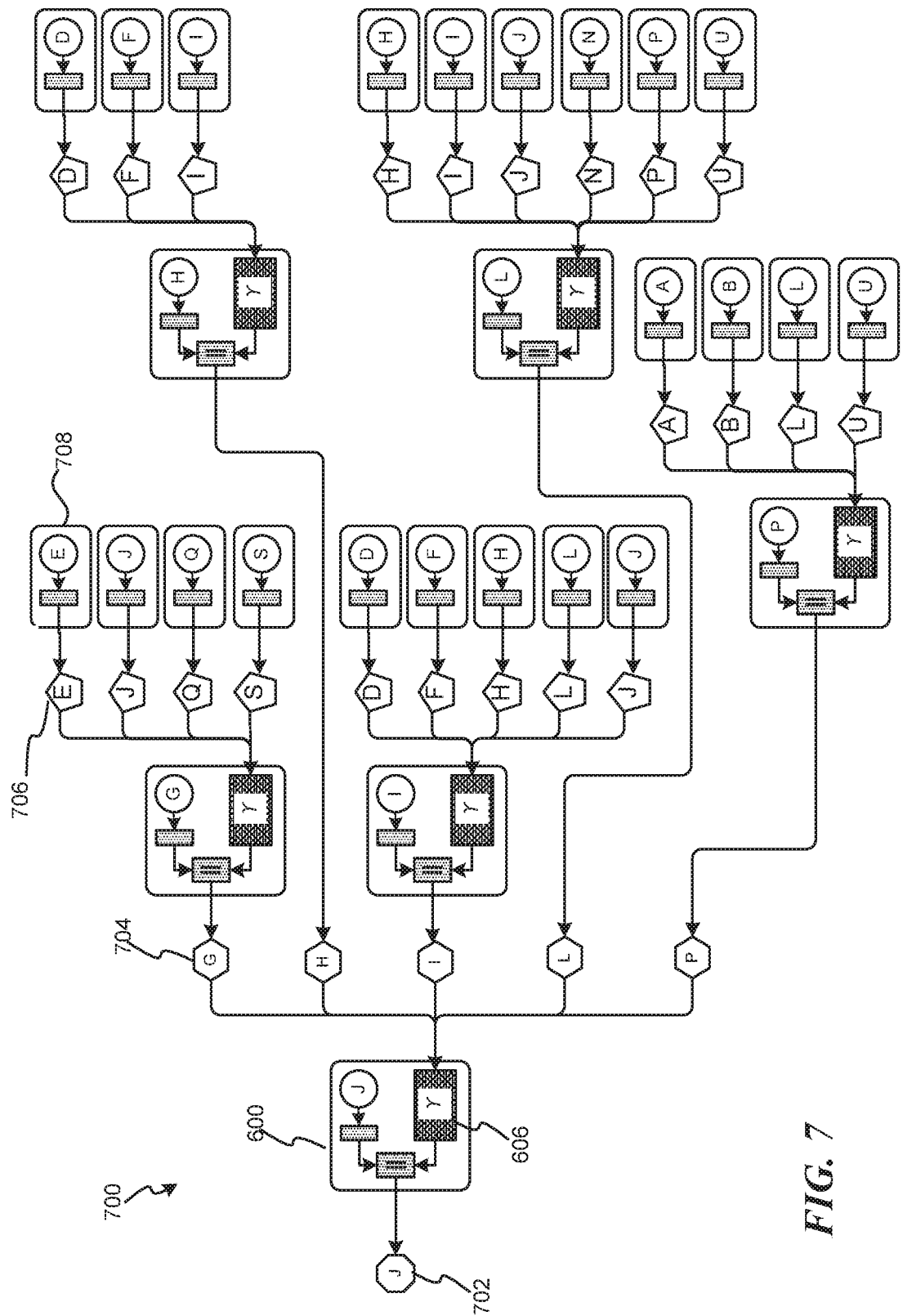
FIG. 7 is a pictorial diagram illustrating the exemplary generation of an aggregated embedding vector for a target node according to aspects of the disclosed subject matter.

FIG. 7 is a pictorial diagram illustrating the exemplary generation 700 of an aggregated embedding vector 702 for a target node, Node J, of corpus graph 100, according to aspects of the disclosed subject matter. As can be seen, the generating process includes the application of the process 600 with regard to Node J to generate the aggregated embedding vector 702. As can be seen, input to the combination/aggregation 606 of Node J's neighbors includes aggregated embedding vectors for Nodes G, H, I, L and P.

As can be seen, each of Node J's neighbors are similarly processed to generate aggregated embedding vectors. Each includes a convolution of a node in addition to the concatenation of the convolved embedding vector with neighborhood embedding information. Of difference from the processing of target Node J is the fact that in processing the embedding vectors of Node J's neighbors the input level does not reach as far to other neighbors, being limited each time in each recursive process. As can be seen, in processing the aggregated embedding vector for Node G, embedding vectors for Node G's neighbors, including Nodes E, J, Q, and S, are also processed. However, since the input level is reached at processing Node E, Node E's neighbors are not factored into the embedding vector 706 for Node E. Also, for illustration purposes the processing 708 of the final level nodes is simplified, showing only the convolution of the node and not showing the aggregation of null neighborhood embedding information. Also, because each increased level of aggregated embedding vector is based on less neighborhood embedding information, the various levels of aggregated embedding vectors in FIG. 7 are shown in slightly different shapes. More particularly, the aggregated embedding vector of level 0 (for target Node J) is shown as an octagon, the aggregated embedding vectors of level 1 (e.g., for Node G) are shown as a hexagon, and the aggregated embedding vectors of level 2 (e.g., for Node E) are shown as pentagons.

Figure 8:
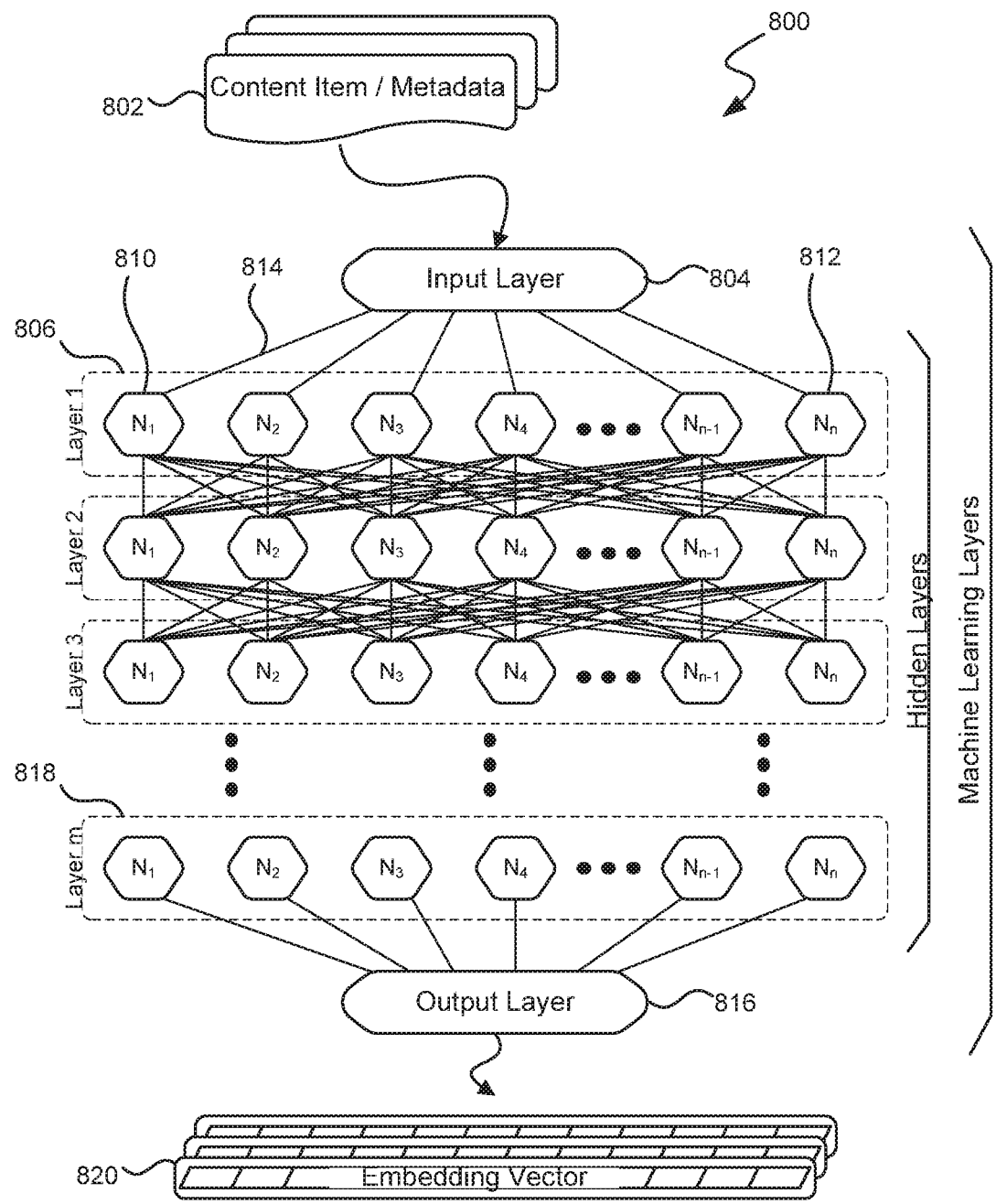
FIG. 8 is a pictorial diagram illustrating elements of a deep learning/machine learning model suitable for generating embedding vectors in accordance with aspects of the disclosed subject matter.

As mentioned above and according to various aspects of the disclosed subject matter, embedding vectors for content items may be generated from a convolution process. Typically, though not exclusively, the convolution process is carried out by a trained, deep neural network. FIG. 8 is a pictorial diagram illustrating elements of a deep learning network 800 (also referred to as a deep machine learning model) suitable for generating one or more embedding vectors, such as embedding vector 820, for one or more content items and corresponding metadata, such as content item 802, in accordance with aspects of the disclosed subject matter.

As those skilled in the art will appreciate, the deep neural network 800 comprises multiple executable layers, including an input layer 804, and output layer 816, and one or more hidden layers. By way of illustration, executable model 800 includes m hidden layers, including hidden layers 806 and 818. The input layer 804 accepts the input data (e.g., content item 802 and its metadata) for which the model 800 will generate a corresponding result (e.g., embedding vector 820).

The input layer 804 accepts the input data (in this case content item 802 and any metadata that may be associated with the content item) and, according to one or more predetermined algorithms and/or heuristics, generates a plurality of values for one or more aspects, features and/or facets from the input data. These values (not illustrated but implied by the various edges, such as edge 814, extending from the input layer 804 to the various processing nodes of the first hidden layer 806) are output of the first layer and distributed as input data to processing nodes, such as processing nodes 810 and 812, in the first of the hidden layers of the executable model 800.

Typically, though not exclusively, a value/facet of the input data passed from the input layer 804 to a first processing node in the first hidden layer, such as node 810 of hidden layer 806, is different than a value/facet passed to a second processing node of that same hidden layer, such as to node 812 of hidden layer 806.

Each hidden layer comprises a plurality of processing nodes. By way of illustration and not limitation, hidden layer 806 includes n processing nodes $N_1$-$N_n$. While the processing nodes of the first hidden layer 806 typically, though not exclusively, have a single input from the input layer, processing nodes of subsequent hidden layers typically have input values from one or more processing nodes of the previous input layer. As illustrated in executable model 800, each hidden layer (except for the first hidden layer 806) accepts input data/signals from each of the processing nodes of the prior hidden layer, as indicated by the edges proceeding from a processing node of an "upper" hidden layer (e.g., layer 806) to a "lower" hidden layer.

Each processing node implements one or more "convolutions" or "computations" on the input data it receives (whether the processing node receives a single item of input data, or plural items of input data) to produce a single output. These convolutions/computations may include any number of functions to generate the output data, such as (by way of illustration and not limitation) aggregations, clusterings, transformations, combinations, selections and/or filters, mathematical manipulations, linear and multivariate regressions, statistical determinations and predictions, and the like. Moreover, individual items of input data may be weighted such that a given item of input data plays a greater or lesser role in the overall computation of any processing node. Items of input data may be weighted in such a manner as to be ignored in convolution. Hyperparameters (data/values that are input from sources external to processing nodes of a prior input level) may also be utilized by all or some of the processing nodes of a hidden layer.

As will be appreciated by those skilled in the art, one of the interesting aspects of machine learning is that the various levels of the machine learning model are self-learning, meaning that when provided feedback, modifications are made to the weights, parameters, and processing of nodes in the various layers in order to achieve better results. Thus, except for initially established computations of the various processing nodes in a training phase of the machine learning process, a person is unlikely to have specific insight or knowledge as to the exact computations that any particular processing node of a hidden layer may utilize. Instead, during the training process of a machine learning process, the machine learning process makes its own determinations as to how to modify each computation to produce better/superior results for the input values it receives.

At the final hidden input layer, e.g., layer 818, the processing nodes provide their output data to the output layer 816. The output layer 816 performs whatever aggregations, calculations, normalizations and/or interpretations of the various items of input data to produce an output value of the model. In the illustrated example, the output layer 816 produces an embedding vector 820 for the content item 802 and corresponding metadata. According to one embodiment of the disclosed subject matter, to produce the embedding vectors of a content item, the output layer 816 aggregates each item of output data from the final hidden layer 818 as the dimension of an embedding vector.

Regarding routines 200, 300 and 500 described above, as well as other routines and/or processes described or suggested herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only or best order in which the steps may be carried out. Moreover, in some instances, some of these steps may be combined and/or omitted. Optimizations of routines may be carried out. Those skilled in the art will recognize that the logical presentation of steps is sufficiently instructive to carry out aspects of the claimed subject matter irrespective of any particular development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines and/or processes include various novel features of the disclosed subject matter, other steps (not listed) may also be included and carried out in the execution of the subject matter set forth in these routines, some of which have been suggested above. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to FIG. 9 below. Additionally, in various embodiments all or some of the various routines may also be embodied in executable hardware modules including, but not limited to, systems on chips (SoC's), codecs, specially designed processors and or logic circuits, and the like.

As suggested above, these routines and/or processes are typically embodied within executable code blocks and/or modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and propagated signals.

Figure 9:
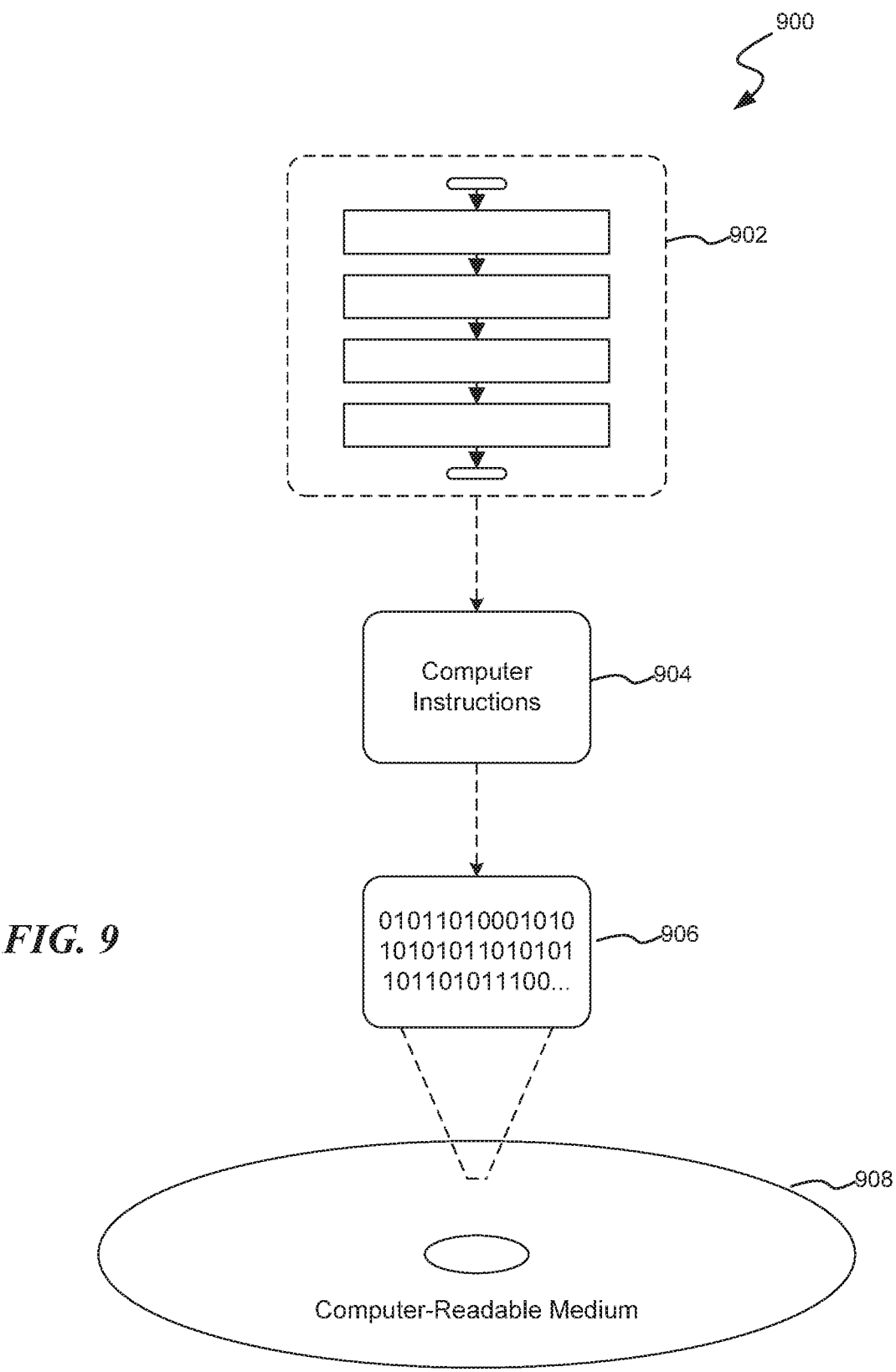
FIG. 9 is a block diagram illustrating an exemplary computer readable medium encoded with instructions for determining an aggregated embedding vector for a target node as described in regard to routines disclosed herein.

Regarding computer readable media, FIG. 9 is a block diagram illustrating an exemplary computer readable medium encoded with instructions for determining an aggregated embedding vector for a target node as described in regard to routines and process disclosed above. More particularly, the implementation 900 comprises a computer-readable medium 908 (e.g., a CD-R, DVD-R or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as at least some of exemplary routines 200, 300 and 500, for example. In another such embodiment, the processor-executable instructions 904 may be configured to implement a system on a computing device, such as at least some of the exemplary, executable components of computing device 1000 of FIG. 10, as described below. Many such computer readable media may be devised, by those of ordinary skill in the art, which are configured to operate in accordance with the techniques presented herein.

Figure 10:
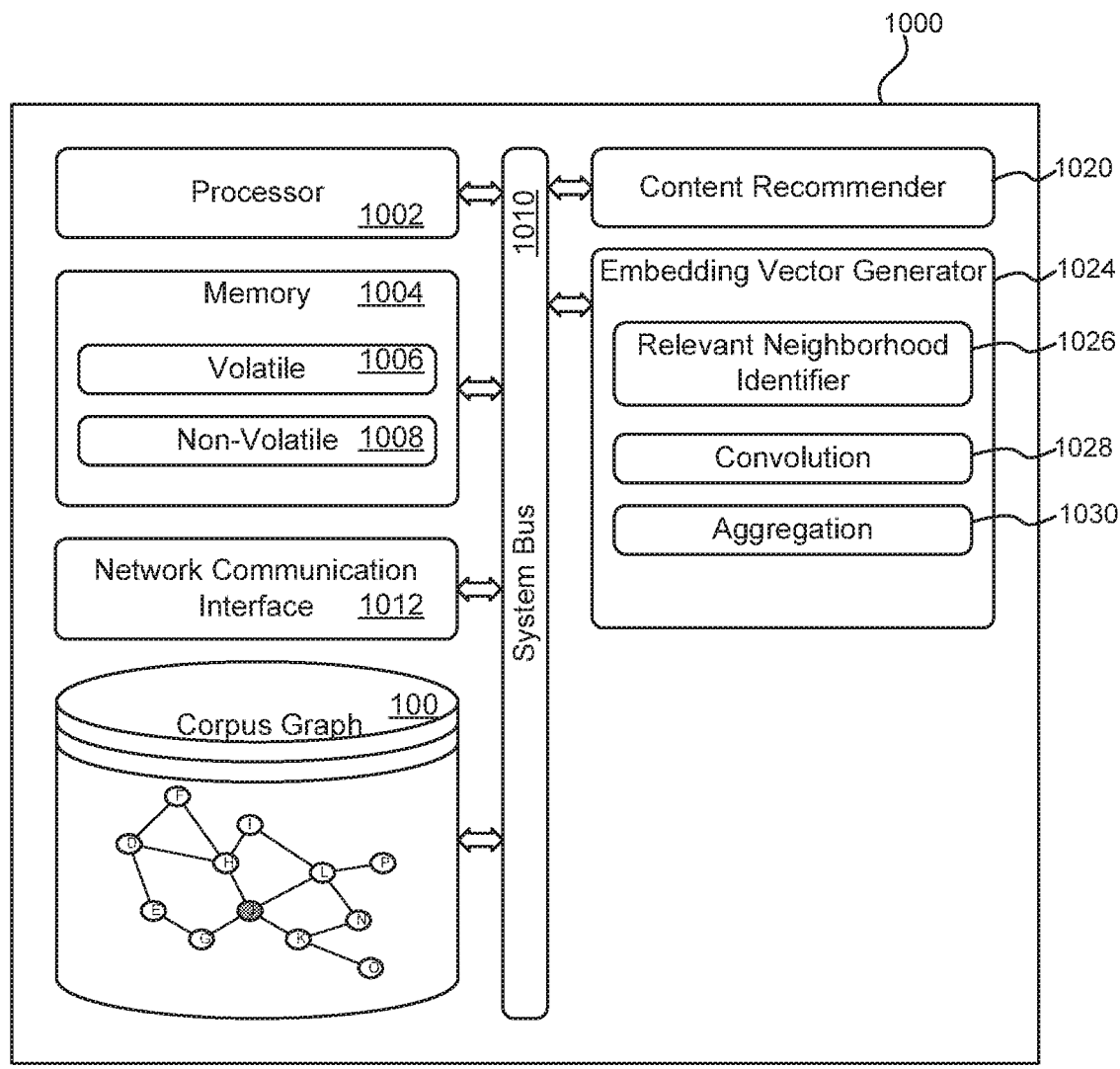
FIG. 10 is a block diagram illustrating an exemplary computing system (or computing device) suitably configured for implementing a content recommender system in accordance with aspects of the disclosed subject matter.

Turning now to FIG. 10, FIG. 10 is a block diagram illustrating an exemplary computing system 1000 (or computing device) suitably configured for implementing a content recommender system in accordance with aspects of the disclosed subject matter. The computing system 1000 typically includes one or more processors (or processing units), such as processor 1002, and further includes at least one memory 1004. The processor 1002 and memory 1004, as well as other components of the computing system, are interconnected by way of a system bus 1010.

As will be appreciated by those skilled in the art, the memory 1004 typically (but not always) comprises both volatile memory 1006 and non-volatile memory 1008. Volatile memory 1006 retains or stores information so long as the memory is supplied with power. In contrast, non-volatile memory 1008 is capable of storing (or persisting) information even when a power supply is not available. Generally speaking, RAM and CPU cache memory are examples of volatile memory 1006 whereas ROM, solid-state memory devices, memory storage devices, and/or memory cards are examples of non-volatile memory 1008.

As will be further appreciated by those skilled in the art, the processor 1002 executes instructions retrieved from the memory 1004, from computer readable media, such as computer readable media 908 of FIG. 9, and/or other executable components in carrying out the various functions of recommending likely digital content items for a content collection. The processor 1002 may be comprised of any of a number of available processors such as single-processor, multi-processor, single-core units, and multi-core units, which are well known in the art.

Figure 12:
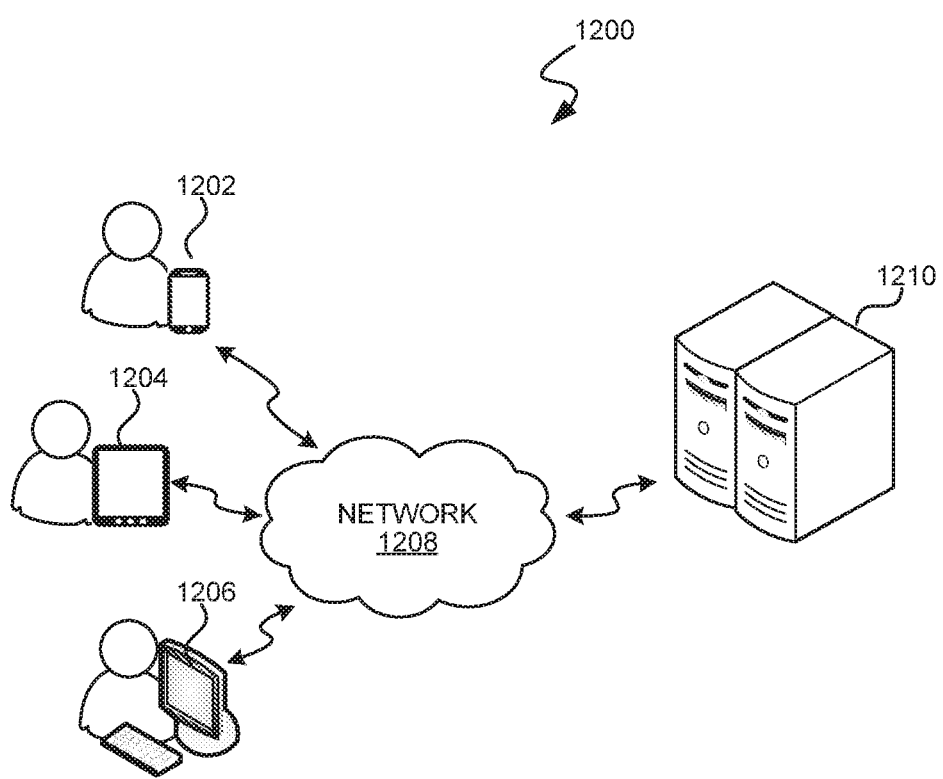
FIG. 12 is a block diagram illustrating an exemplary network environment suitable for implementing aspects of the disclosed subject matter.

Further still, the illustrated computing system 1000 typically also includes a network communication interface 1012 for interconnecting this computing system with other devices, computers and/or services over a computer network, such as network 1208 of FIG. 12. The network communication interface 1012, sometimes referred to as a network interface card or NIC, communicates over a network using one or more communication protocols via a physical/tangible (e.g., wired, optical fiber, etc.) connection, a wireless connection such as WiFi or Bluetooth communication protocols, NFC, or a combination thereof. As will be readily appreciated by those skilled in the art, a network communication interface, such as network communication component 1012, is typically comprised of hardware and/or firmware components (and may also include or comprise executable software components) that transmit and receive digital and/or analog signals over a transmission medium (i.e., the network).

The computing system 1000 further includes an executable content recommender component 1020. In execution on the computing system 1000, the content recommender component 1020 operates in a similar manner to that described in regard to routine 1100 below. Indeed, the content recommender component 1020 receives a query from a user over a network, such as network 1208, identifies the content item (or a closely matching content item) in a corpus graph 100, identifies potential recommendations for the user, and provides at least one recommendation of the potential recommendations to the user.

Also included in the computing system 1000 is an executable embedding vector generator 1024. In execution on the computing system 1000, the embedding vector generator 1024 is configured to generate aggregated embedding vectors for one or more nodes in the corpus graph 100, as describe above in regard to the various routines 200, 300 and 500. The embedding vector generator 1024 includes one or more executable convolution modules 1028 that operate to convolve or generate various embedding vectors for nodes in the corpus graph in the course of generating an aggregated embedding vector for a given target node. Similarly, the embedding vector generator 1024 includes one or more executable aggregation modules 1030, as set forth and described above in regard to routine 500 of FIG. 5.

Figure 11:
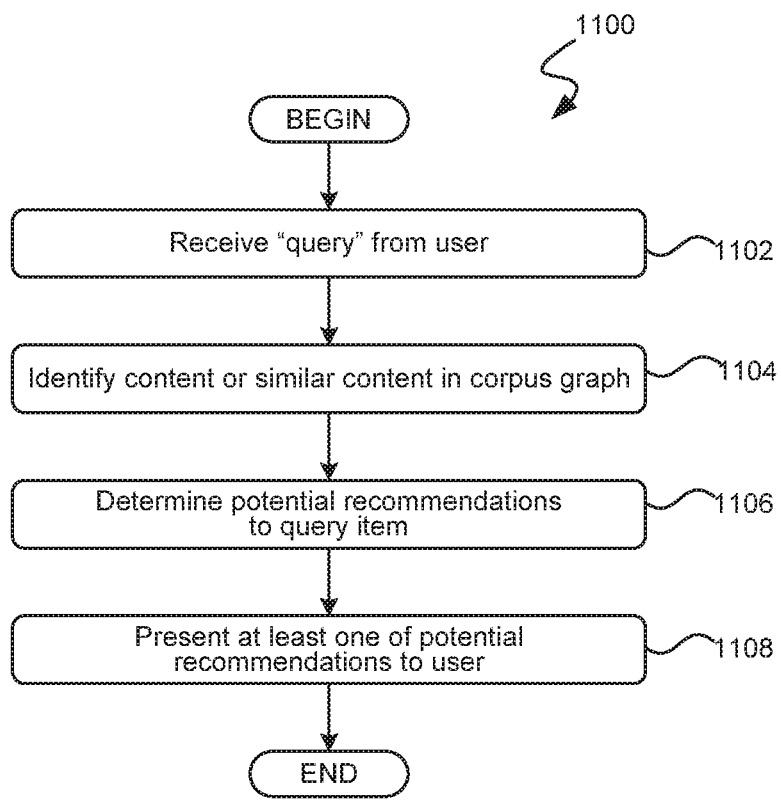
FIG. 11 is a flow diagram illustrating an exemplary recommender routine for responding with content recommendations to receiving a query.

Turning to FIG. 11, FIG. 11 is a flow diagram illustrating an exemplary routine 1100 of a recommender system for responding to a query from a user, and in accordance with various aspects of the disclosed subject matter. Beginning at block 1102, the recommender system, such as recommender system 1210 of FIG. 12, receives a query from a user. As indicated above, the term query refers to content from a user for which one or more recommendations of content are to be made. A "query" may be generated by a computer user by interaction with a content item and not necessarily through direct intention to request additional content.

At block 1104, the recommender system identifies the received content item or a similar content item in the corpus graph, such as corpus graph 100. In identifying the content item or similar content item, at block 1104 an embedding vector may be generated for the received content item to facilitate matching of the received content item to an item in the corpus graph. In the case of finding a similar content item in the corpus graph, matching using various techniques, such as K-means clustering, may be used to locate one or more similar content items/nodes in the corpus graph.

At block 1106, after having identified either the content item in the corpus graph, or a close match in the corpus graph, an evaluation of the aggregated embedding vector of item of the corpus graph is used to find near matches, again using clustering and matching techniques that are known in the art.

At block 1108, from the set of near matching, at least one potential near match is provided to the user as a recommendation to the user. Thereafter, the routine 1100 terminates.

Turning to FIG. 12, FIG. 12 is a block diagram illustrating an exemplary network environment 1200 suitable for implementing aspects of the disclosed subject matter. In particular the network environment includes one or more computer users operating via computing devices, such as computing devices 1202-1206, for connecting over a network 1208 with other online services, such as recommender service 1210. As will be appreciated by those skilled in the art, the user computers may comprise any of a variety of computing devices such as, by way of illustration and not limitation, tablet computers (such as tablet computer 1204), laptop computers, desktop computers (such as desktop computer 1206), smart phones (such as smart phone 1202), and the like.

The user computers 1202-1206 communicate with other computers and/or devices over one or more networks, such as network 1208. As will be appreciated by those skilled in the art, the network 1208 is a telecommunication network over which computing devices and network enabled processes and/or services may communicate and/or exchange data. By way of illustration, a computer network such as network 1208 may comprise any of a local area network or LAN, a wide area network or WAN, or combinations of the two. According to various embodiments of the disclosed subject matter, the network 1208 may comprise the Internet. As those skilled in the art will appreciate, the Internet is a global system of interconnected computer networks that use a defined protocol suite to link devices (including computers) worldwide. Additionally, the Internet is a network of networks that consists of private, public, academic, business, and government networks of varying scope and size, linked by a broad array of electronic, wireless, and optical networking technologies. According to aspects of the disclosed subject matter, the personal computing devices, including user computing devices 1202-1206, can communicate with the network 1208 by way of a wired connection, a wireless connection, an optical connection, or any combination of these.

Also included in the exemplary network environment 1200 is an online recommender service 1210 on a network computing system. As described above, the online recommender service 1210 is configured to receive a query from a computer user over the network 1208 and, in response, provide one or more recommendations of content relevant to the query item to the user.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for determining an aggregated embedding vector for a target node of a corpus graph according to a neighborhood of the target node in the corpus graph, the method comprising:
   determining, using a graph-based convolutional network (GCN), an embedding vector of the target node;
   determining, based at least in part on embedding vectors associated with nodes of the neighborhood and generated using the GCN, neighborhood embedding information for the target node, wherein:
      the neighborhood embedding information comprises embedding information of the neighborhood of the target node in the corpus graph;
      determining the neighborhood embedding information includes:
         determining a respective neighbor aggregated embedding vector for each neighboring node of the neighborhood of the target node;
         determining, based at least in part on a respective frequency of visits to each neighboring node of the neighborhood, a respective weight for each respective neighbor aggregated embedding vector; and
         combining the respective neighbor aggregated embedding vectors to generate the neighborhood embedding information by selecting features of the respective neighbor aggregated embedding vectors in accordance with the respective weights determined for each respective neighbor aggregated embedding vector; and
      the GCN is trained to generate a corresponding embedding vector based at least in part on received input data and includes a deep neural network having a plurality of executable layers with a plurality of processing nodes that are trained to process input values from a previous layer to generate output values;
   generating an aggregated embedding vector for the target node, the aggregated embedding vector comprising the embedding vector of the target node concatenated with the neighborhood embedding information for the target node; and
   associating the aggregated embedding vector with the target node.

2. The computer-implemented method of claim 1, further comprising:
   receiving a query from a computer user;
   determining that the query corresponds to the target node of the corpus graph; determining a plurality of potential recommendation nodes as recommendations for the computer user in view of the query, where the plurality of potential recommendation nodes are identified from the corpus graph according to the aggregated embedding vector of the target node; and providing at least one of the plurality of potential recommendation nodes to the user in response to the query as a recommended node to the user.

3. The computer implemented method of claim 2, further comprising:

identifying a relevant neighborhood to the target node within the corpus graph;

wherein the neighboring nodes used in determining the neighborhood embedding information for the target node are within the relevant neighborhood within the corpus graph.

4. The computer implemented method of claim 3, wherein identifying the relevant neighborhood to the target node within the corpus graph comprises iteratively conducting the following, beginning from the target node as the current node:

randomly selecting a traversal from the current node to another node connected to the current node;

setting the current node to the another node; and incrementing a visit count associated with the another node.

5. The computer implemented method of claim 4, wherein identifying the relevant neighborhood to the target node within the corpus graph further comprises:

in addition to randomly selecting a traversal from the current node to another node connected to the current node, randomly determining whether to reset the current node to the target node; and resetting the current node to the target node upon the random determination to do so.

6. The computer implemented method of claim 5, wherein the iteratively conducting is conducted for a predetermined number of iterations.

7. The computer implemented method of claim 6, wherein the neighboring nodes of the relevant neighborhood of the target node are determined according to those nodes of the corpus graph associated with a highest visit count.

8. The computer implemented method of claim 1, wherein the aggregated embedding vectors from each of the neighboring nodes of the target node comprises further neighborhood embedding information of a plurality of neighbor nodes of an immediate neighbor node of the target node.

9. The computer implemented method of claim 8, wherein the aggregated embedding vectors of the immediate neighbor nodes comprises an aggregation of an aggregated embedding vector of each of a plurality of immediate neighbor nodes of the immediate neighbor node of the target node.

10. The computer implemented method of claim 9, wherein the embedding vector of each of the plurality of immediate neighbor nodes of the immediate neighbor node of the target node is weighted in aggregation with the embedding vectors of other immediate neighbor nodes of the immediate neighbor node of the target node according to visit counts associated with nodes of the corpus graph used in determining the relevant neighborhood to the target node.

11. A non-transitory computer readable medium bearing computer executable instructions which, when executed on a computing system comprising at least a processor retrieving instructions from the non-transitory computer readable medium, carry out a method for determining an aggregated embedding vector for a target node of a corpus graph according to a neighborhood of the target node in the corpus graph, the method comprising:

identifying a relevant neighborhood of nodes to the target node within the corpus graph;

determining, using a graph-based convolutional network (GCN), an embedding vector of the target node;

determining, based at least in part on embedding vectors associated with nodes of the relevant neighborhood and generated using the GCN, neighborhood embedding information for the target node, wherein:

the neighborhood embedding information comprises embedding information from the nodes within the relevant neighborhood within the corpus graph;

determining the neighborhood embedding information includes:

determining, based at least in part on a respective frequency of visits to each node of the relevant neighborhood, a respective weight for each embedding vector associated with the nodes of the relevant neighborhood; and combining the embedding vectors associated with the nodes of the relevant neighborhood to generate the neighborhood embedding information by selecting features of the embedding vectors associated with the nodes of the relevant neighborhood in accordance with the respective weights determined for each embedding vector associated with the nodes of the relevant neighborhood; and the GCN is trained to generate a corresponding embedding vector based at least in part on received input data and includes a deep neural network having a plurality of executable layers with a plurality of processing nodes that are trained to process input values from a previous layer to generate output values;

generating an aggregated embedding vector for the target node, the aggregated embedding vector comprising the embedding vector of the target node concatenated with the neighborhood embedding information for the target node; and associating the aggregated embedding vector with the target node.

12. The non-transitory computer readable medium of claim 11, wherein identifying the relevant neighborhood of nodes to the target node within the corpus graph comprises:

beginning from the target node as the current node and for a predetermined number of repetitions, repeatedly:

randomly selecting a traversal from the current node to another node connected to the current node;

setting the current node to the another node; and incrementing a visit count associated with the another node;

wherein the nodes of the relevant neighborhood of the target node are determined according to those nodes of the corpus graph associated with a highest visit count.

13. The non-transitory computer readable medium of claim 12, wherein identifying the relevant neighborhood of nodes to the target node within the corpus graph further comprises:

randomly determining whether to reset the current node to the target node; and resetting the current node to the target node upon the random determination to do so.

14. The non-transitory computer readable medium of claim 13, wherein the embedding vectors associated with nodes of the relevant neighborhood used in generating the neighborhood embedding information for the target node include aggregated embedding vectors from nodes in the relevant neighborhood of the target node.

15. The non-transitory computer readable medium of claim 14, wherein the aggregated embedding vectors of each of a plurality of immediate neighbor nodes of the target node comprises second neighborhood embedding information of second neighbor nodes neighboring the plurality of immediate neighbor nodes of the target node.

16. The non-transitory computer readable medium of claim 15, wherein the second neighborhood embedding information of the second neighbor nodes comprises respective second neighborhood embedding information associated with each of the second neighbor nodes.

17. A computer system configured as a recommender system for providing recommended content in response to a user query, the computer system comprising a processor and a memory, wherein the processor executes instructions stored in the memory as part of or in conjunction with additional components to respond to the user query, the additional components comprising:
    a content recommender component that, in execution on the computer system:
        receives the user query from the user over a network, the user query comprising an item of content;
        identifies a corresponding item of content to the user query in a corpus graph maintained by the recommender system;
        determines a set of potential content recommendations for the user according to an aggregated embedding vector associated with the corresponding item of content in the corpus graph;
        selects at least one content recommendation from the set of potential content recommendations; and
        provides the at least one content recommendation to the user; and
    an embedding vector generator including a graph-based convolutional network (GCN) trained to generate a corresponding embedding vector based at least in part on received input data and includes a deep neural network having a plurality of executable layers with a plurality of processing nodes that are trained to process input values from a previous layer to generate output values that, in execution on the computer system:
        determines a relevant neighborhood of the corresponding item of content in the corpus graph;
        determines a respective neighbor aggregated embedding vector for each neighboring node of the relevant neighborhood of the corresponding item of content;
        determines, based at least in part on a respective frequency of visits to each neighboring node of the relevant neighborhood, a respective weight for each respective neighbor aggregated embedding vector; and
        combines the respective neighbor aggregated embedding vectors to generate the aggregated embedding vector for the corresponding item of content in the corpus graph by selecting features of the respective neighbor aggregated embedding vectors in accordance with the respective weights determined for each respective neighbor aggregated embedding vector.

* * * * *